United States Patent [19]

Rieger et al.

[11] Patent Number: 4,481,990

[45] Date of Patent: Nov. 13, 1984

[54] DEVICE FOR TIRE PROTECTION AND/OR SKID PROTECTION FOR VEHICLE TIRES

[75] Inventors: Hansjörg W. Rieger, Aalen; Erhard A. Weidler, Aalen-Unterkochen, both of Fed. Rep. of Germany

[73] Assignee: RUD-Kettenfabrik Rieger & Dietz Gmbh u. Co., Aalen, Fed. Rep. of Germany

[21] Appl. No.: 68,552

[22] Filed: Aug. 22, 1979

[30] Foreign Application Priority Data

Aug. 29, 1978 [DE] Fed. Rep. of Germany ....... 2838048

[51] Int. Cl.³ .............................................. B60C 27/00
[52] U.S. Cl. .................................. 152/172; 152/189; 152/213 A; 152/218; 152/224; 152/245
[58] Field of Search ............... 152/170, 171, 172, 179, 152/180, 182, 183, 184, 188, 189, 191, 217, 218, 219, 223, 224, 244, 245, 213 A, 169

[56] References Cited

U.S. PATENT DOCUMENTS

| | | | |
|---|---|---|---|
| 1,395,057 | 10/1921 | Nelson | 152/218 |
| 2,259,189 | 10/1941 | Williams et al. | 152/224 |
| 3,910,333 | 10/1975 | Müller | 152/171 X |
| 4,128,446 | 12/1978 | Dohmeier | 152/169 X |
| 4,215,733 | 8/1980 | Rieger et al. | 152/171 |
| 4,321,955 | 3/1982 | Rieger et al. | 152/171 |

FOREIGN PATENT DOCUMENTS

1136597 9/1962 Fed. Rep. of Germany.
2109876 9/1971 Fed. Rep. of Germany.

*Primary Examiner*—Caleb Weston
*Assistant Examiner*—Thomas Bokan
*Attorney, Agent, or Firm*—Parmelee, Johnson, Bollinger & Bramblett

[57] ABSTRACT

In a tire protection and/or skid protection for vehicle tires the tread of the tire is provided with recesses, which are to receive tire protectors or skid protectors. These protectors are retained in the recesses by means of retaining strands mounted in grooves of the tire tread. The retaining strands are connected to lateral chains or parts of lateral chain networks respectively which come to bear against the side walls of the vehicle tire, there being at least one tensioning device for tensioning the lateral chains or chain networks.

29 Claims, 32 Drawing Figures

DEVICE FOR TIRE PROTECTION AND/OR SKID PROTECTION FOR VEHICLE TIRES

BACKGROUND OF THE INVENTION

The invention relates to a tire protection and/or skid protection for vehicle tires, the tread of which is provided with recesses, which are to receive tire protectors or skid protectors, and with grooves for retaining strands which hold the protectors in their recesses and can move relative to the protectors.

Since, in a tire protector and/or skid protector of this type, the protectors and the retaining strands are arranged in recesses or grooves, the direct contact between the tire and the ground can be improved, compared with the conditions which apply when conventional tire protection chains or skid protection chains, which are supported on the tread, are used.

A skid protection of the above type is known, wherein essentially cruciform skid protectors are mounted in peripheral and transverse grooves located between rows of blocks or ribs and are held by retaining strands which encircle the tire in the direction of running and are located in peripheral grooves (German Patent Specification No. 1,136,597). For a number of reasons, the known construction cannot be fully satisfactory. A first reason is that it is difficult to re-tension retaining strands which run in the peripheral direction of the vehicle tire, on the one hand because of the length of the retaining strands and the large number of the protectors held by each individual retaining strand and, on the other hand, because of the poor accessibility and the difficult conditions for accommodating tensioning elements. A second reason is that the protectors, during the rolling motion of the vehicle tire, tend to execute tilting motions about tilt axes extending parallel to the axis of the wheel, and these tilting motions must be absorbed by the retaining strands in a manner which promotes wear of the retaining strands. Furthermore, it is virtually impossible to combine the protectors, which in the known solution are located in the region of the tread, with a protection for the side walls of the tire. Moreover, it proves to be a disadvantage that, when exchanging individual protectors of the known skid protection, a large number of further protectors must at least be loosened at the same time. Since the retaining strands running in the peripheral direction also pass through the contact area of the tire, an exchange of these strands and of the protectors is, moreover, completely impossible while the vehicle is standing.

An improvement of the conditions of contact between the vehicle tire and the ground is also the aim of a heavy duty tire which is fitted with tire protection. This tire has a tread into which the running network of a tire protection chain has been vulcanised in, in which case it is necessary to take care during the vulcanisation process that the outer surfaces of the vertical members of the tire protection chain in the region of the tread come to lie substantially in one plane with the latter (German Offenlegungsschrift No. 2,109,876). The manufacture of a tire of this type is extremely complicated and expensive. Last but not least because of the different elasticities of the rubber and of the parts of the chain, high shear forces arise under load between the rubber and the parts of the chain, and these forces have the result that the bond between the elastic rubber and the chain members, initially present on vulcanising in, is lost soon after the tire has been put to use.

Moreover, wear occurs on the links between the chain members in the region of the running network, and this cannot be compensated by re-tensioning. The consequence is that parts of the chain emerge from the tire tread and are thus subjected to loads which they cannot withstand. The tread is destroyed and/or parts of the chain drop out of the tread.

SUMMARY OF THE INVENTION

It is the object of the invention to provide a tire protection and/or skid protection of the type initially mentioned, which is simple to manufacture, has a long life and can readily be re-tensioned and in which individual protectors, the retaining strands or the complete running network can be exchanged in a simple manner.

According to the invention, this object is achieved when the retaining strands join up lateral chains or parts of lateral chain networks, which come to bear against the side walls of the vehicle tire, and which lateral chains or chain networks can be tensioned by at least one tensioning device.

The tire protection and/or skid protection according to the invention, with its retaining strands extending transversely over the tread has the advantage that it can be re-tensioned in a particularly simple manner and each of the retaining strands has to hold only a comparatively small number of protectors. The latter fact not only facilitates the assembly of the tire protection and/or skid protection as a whole, but it also facilitates the exchange of individual protectors. Since the retaining strands are extended into the region of the side walls of the tire, the protection of the tread can readily be combined with protection of the side walls. Such a combination is desirable in particular for work in rocky terrain and in quarries.

BRIEF DISCUSSION OF THE DRAWINGS

In the following text the invention is explained in more detail by reference to several illustrative embodiments represented in the attached drawing, in which.

DETAILED DISCUSSION OF THE DRAWINGS

Figure 1:
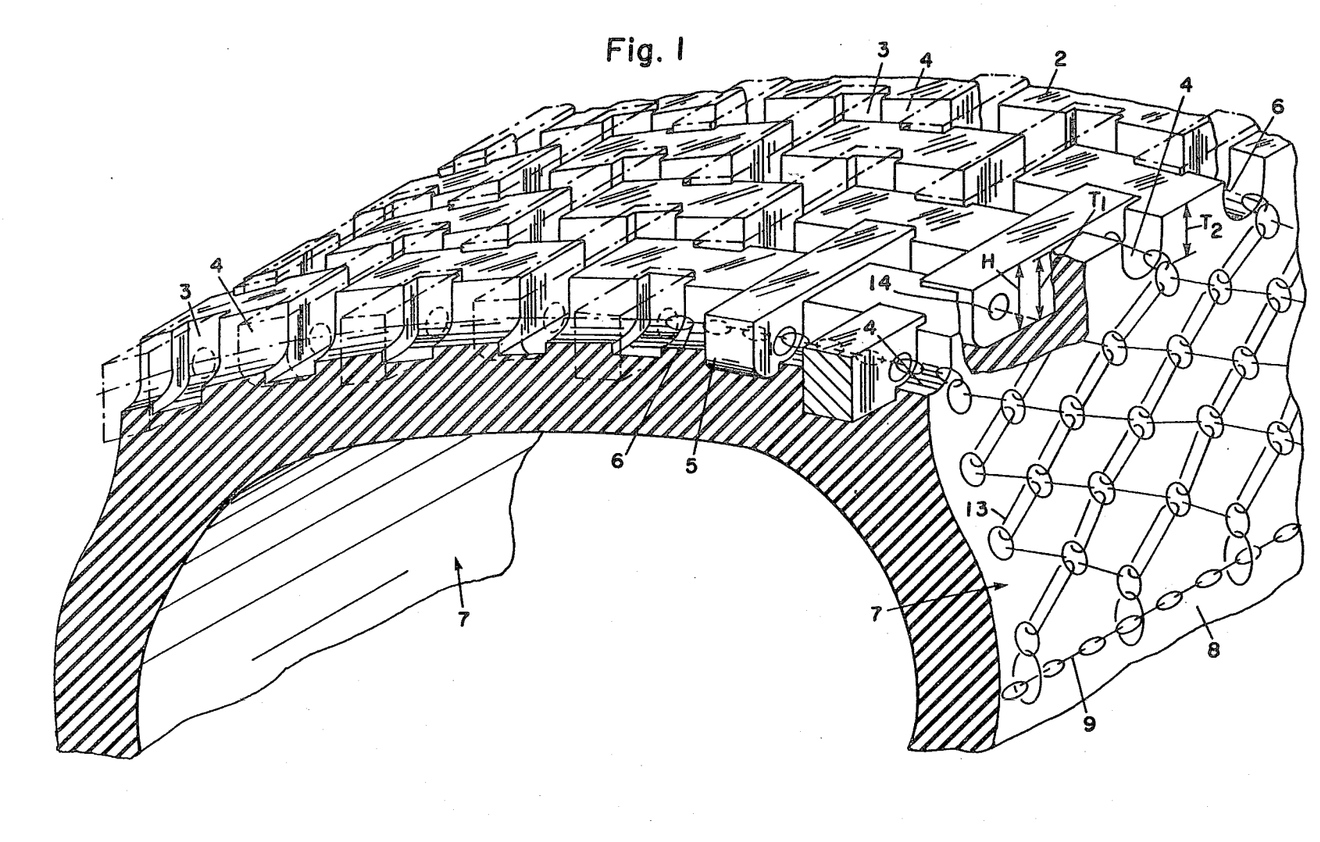
FIG. 1 shows a perspective part-view of a first tire protection.

In FIG. 1, 1 is a vehicle tire, the tread 2 of which is provided with recesses 3 and grooves 4. Tire protectors or skid protectors 5, which are briefly designated as protectors in the following text, are embedded in the recesses 3. The grooves 4 take up retaining strands 6. The retaining strands 6 are joined to parts of lateral chain networks 7, which bear against the side walls 8 of the vehicle tire and which can be tensioned by a tensioning device 9 which, in the solution according to FIG. 1, is formed by a tensioning chain. Only the lateral chain network which is located on the outside of the vehicle tire, is visible in FIG. 1. It is to be understood that a similar chain network is located on the inside of the tire. It is not necessary, however, that the chain network is itself capable of being tensioned, since it can be tensioned via the retaining strands 6 by the tensioning device at the same time as the outer parts of the chain network 7.

Figure 2:
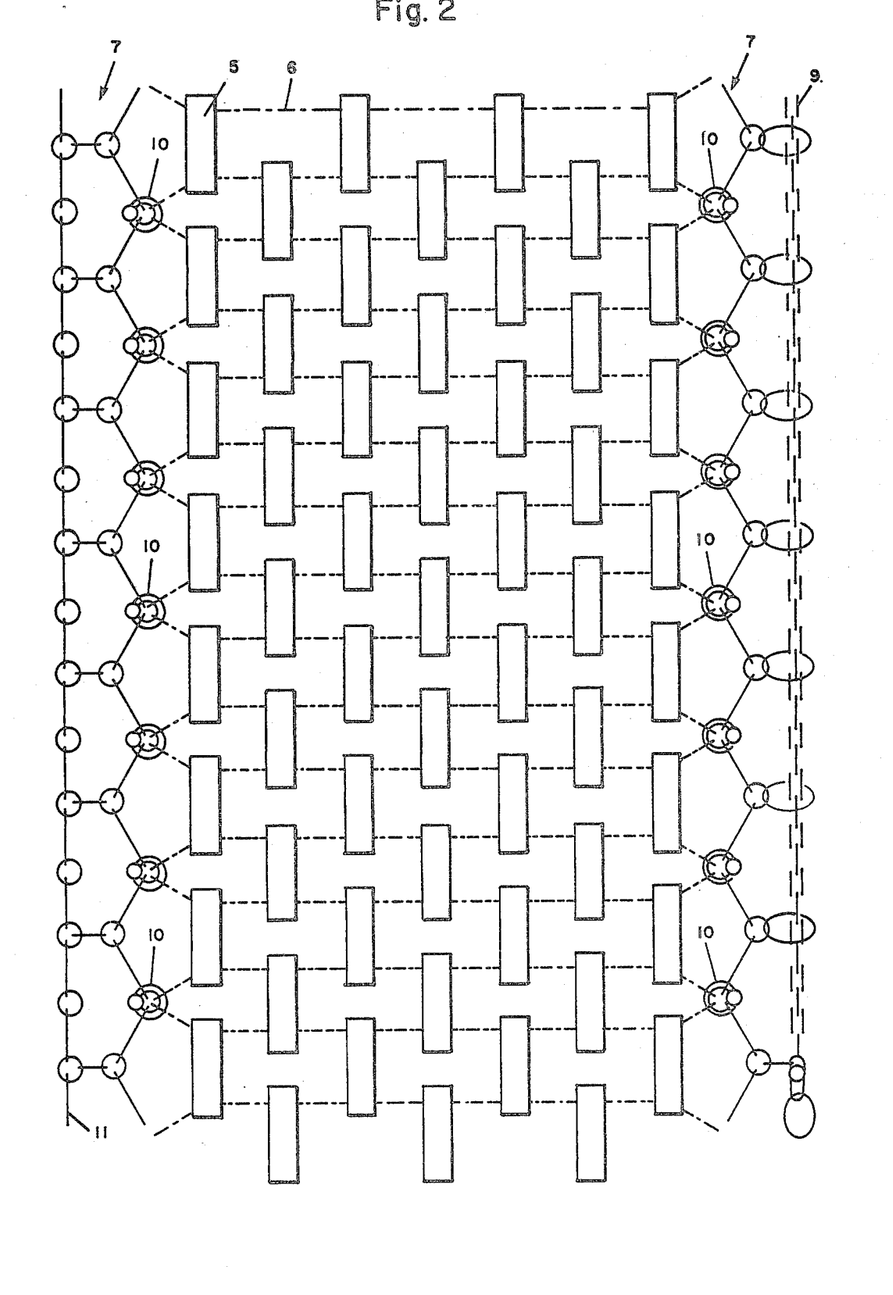
FIG. 2 shows a plan view of a part of a second tire protection spread out like a mat.

FIG. 2 shows a tire protection with modified parts of lateral chain networks. In this Figure, the same reference numerals have been used for parts corresponding to the parts shown in FIG. 1. It can be seen that in the second construction the retaining strands 6 are connected to the parts of the lateral chain networks 7 by means of chain locks 10. On the inside of the tire protection the latter is provided with a lateral chain 11 which cannot be tensioned, whilst a tensioning device 9, formed by a tensioning chain, is again provided on the outside. In order to keep the number of chain locks 10 small, two retaining strands 6 are in each case connected to one chain lock 10.

Figure 3:
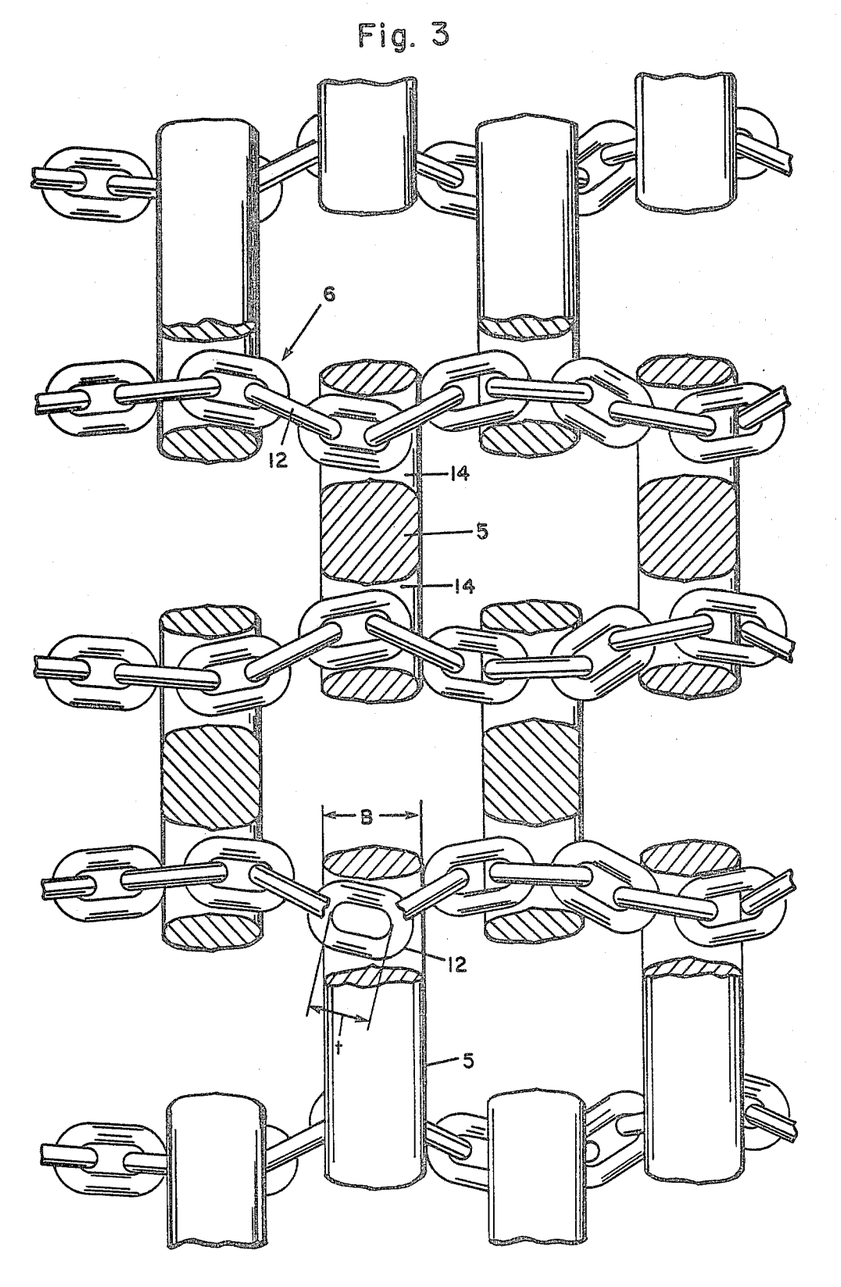
FIG. 3 shows the allocation of protectors to retaining strands in a tire protection or skid protection.

The retaining strands 6 shown in FIG. 3 consist of short chain links 12. The pitch t of these chain links is smaller than the width B of the protectors 5. In particular, the chain links 12 of the retaining strands 6 are smaller than the chain links 13 (compare FIG. 1) of the lateral chain networks.

Each protector 5 is provided, close to its two ends, with one guide channel 14 in each case for the retaining strands 6. In the construction according to FIGS. 1 to 3, the guide channels 14 fully enclose the retaining strands in the region of the protectors 5. The allocation of the protectors 5 and the retaining strands 6 is made in such a way that each retaining strand passes through both front and rear guide channels 14 of protectors.

In FIG. 3, the retaining strands 6 are in a shallow zigzag arrangement. Especially for this reason, the guide channels 14 have the shape of truncated double cones which widen outwards.

The position of the guide channels 14 in the protectors and the depth $T_2$ of the grooves 4 in the tread 2 of the vehicle tire 1 (compare FIG. 1) are matched in such a way that the retaining strands 6 do not protrude beyond the tread of the tire at any point. In contrast, the protectors 5 have a height H, which is preferably greater than the depth $T_1$ of the recesses 3, and consequently protrude beyond the tread 2.

Figure 4:
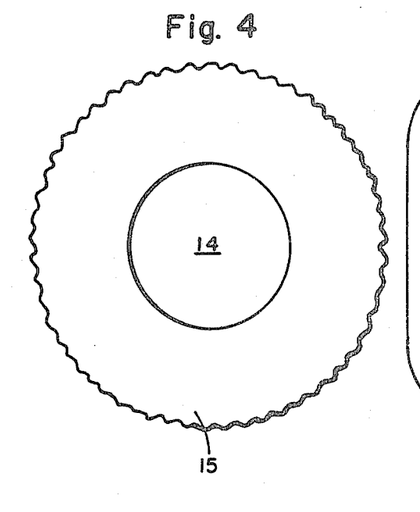
FIGS. 4 to 10 show protectors of various shapes.
Figure 5:
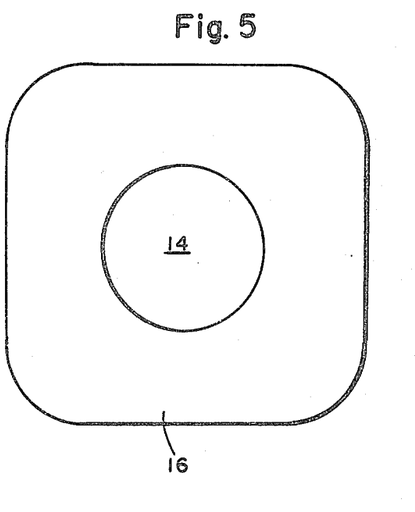
Figure 6:
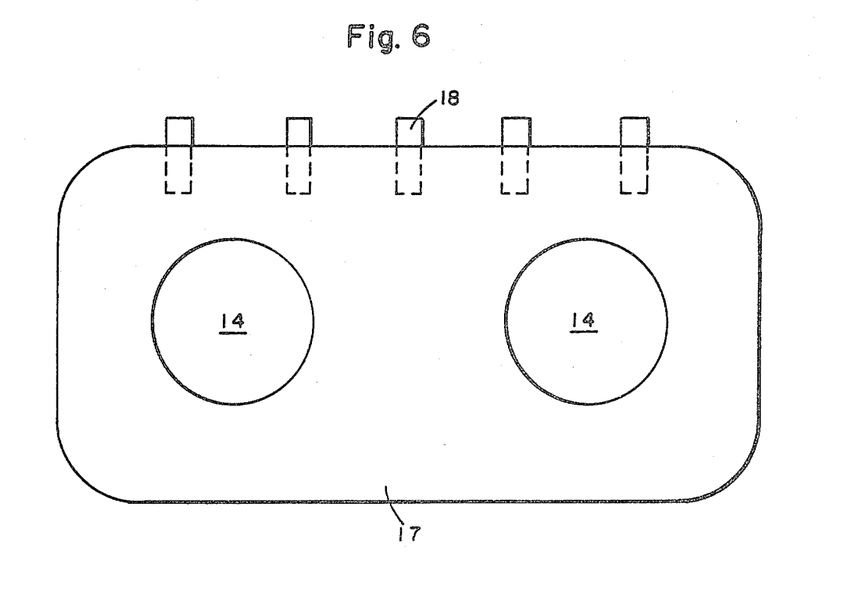
Figure 7:
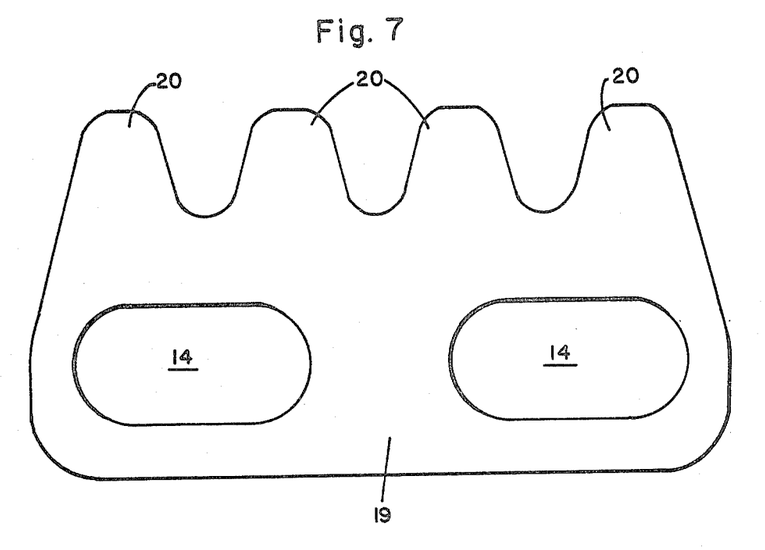
Figure 8:
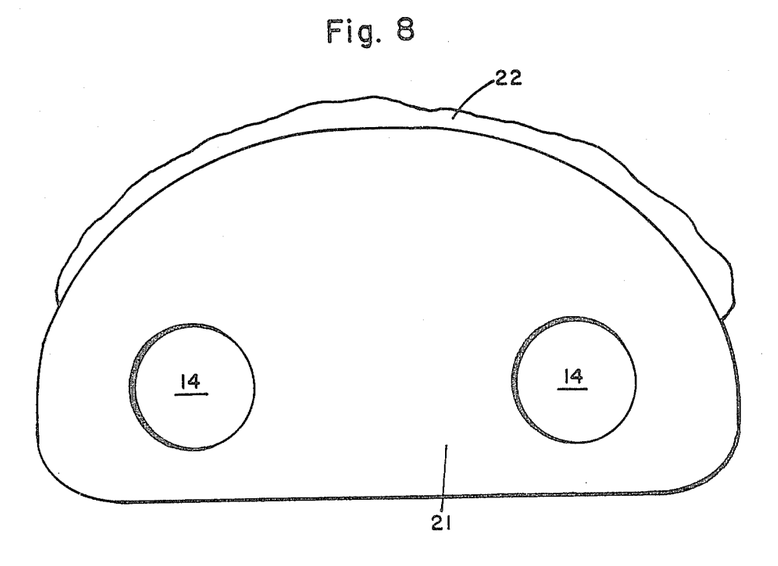
Figure 9:
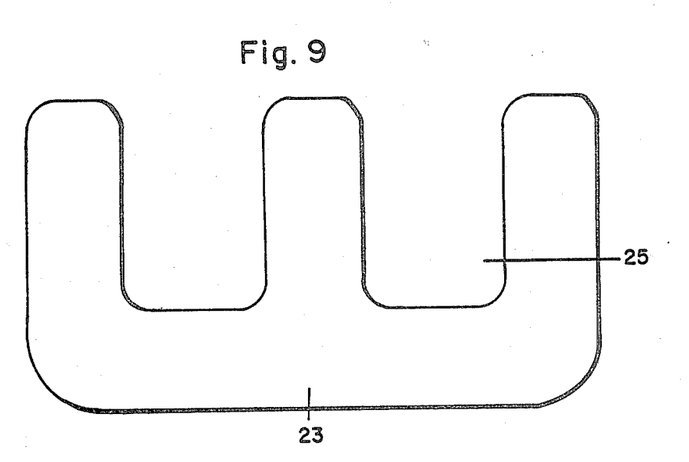
Figure 10:
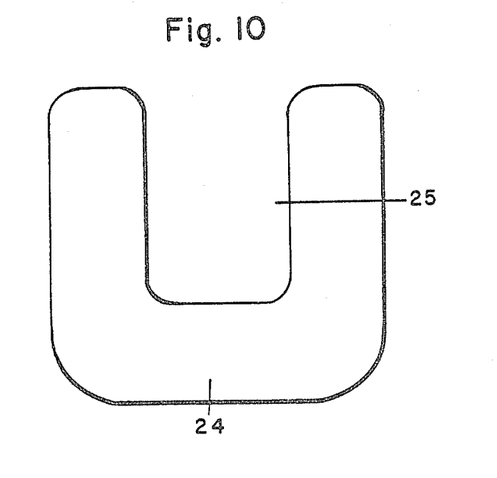

FIG. 4 shows a protector 15 which is profiled on its periphery. In FIG. 5 a protector 16 is represented, the periphery of which has the shape of a square with rounded corners. FIG. 6 shows a protector 17 which is fitted on one side with spikes 18. A protector 19 having four projections 20 which protrude beyond the tread of the vehicle tire is shown in FIG. 7. The protector 21 according to FIG. 8 is provided with a wear facing 22. Whilst the protectors according to FIGS. 4 to 8 are provided with guide channels 14 which fully enclose the retaining strands, the protectors 23 and 24 according to FIGS. 9 and 10 have guide channels 25 which are open to the outside.

Figure 11:
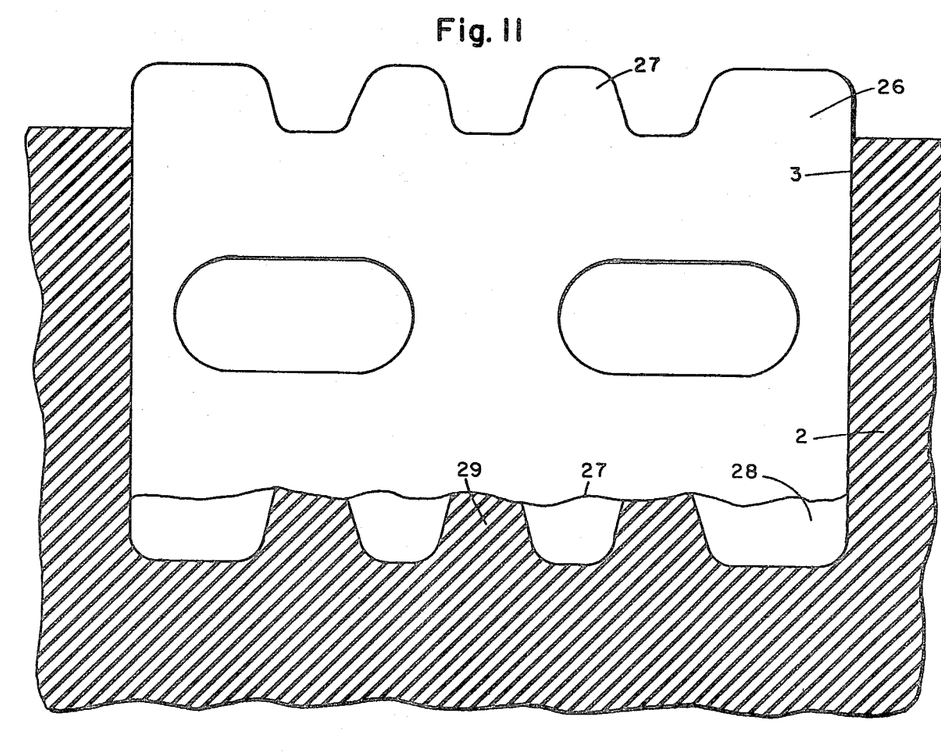
FIG. 11 shows the seating of a reversible protector, worn on one side, in a recess.

FIG. 11 shows a protector 26 which is provided with projections 27 on its opposite sides. In this construction the recess 3 in the tread 2 of the tire is provided in the region of its bottom with depressions 28 which fit projections 27 which are not yet worn. In the drawing the projections 27 located on the underside of the protector 26 are extensively worn. The drawing shows the protector 26 in the position which it takes up after it has been reversed.

As a result of the selected design of the protector, the worn side is also perfectly supported by the projections 29 arranged between the depressions 28. The service life of a skid protection or tire protection fitted with protectors 26 can be markedly improved by reversing the protectors.

Figure 12:
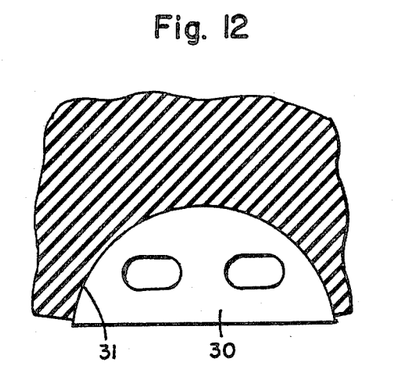
FIG. 12 shows the arrangement of a crescent-shaped protector in a recess adapted to the outline of the protector.
Figure 13:
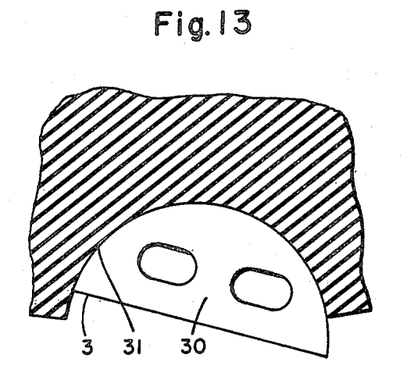
FIG. 13 shows the scope for a displacement of the protector according to FIG. 12.
Figure 14:
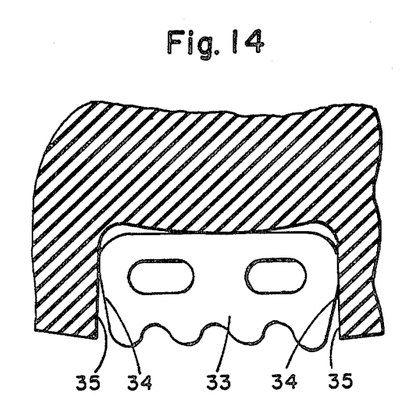
FIG. 14 shows the arrangement of a protector in a recess having a domed bottom.
Figure 15:
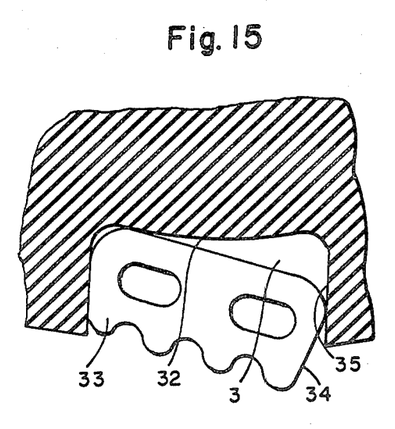
FIG. 15 shows the scope for a displacement of the protector according to FIG. 14.
Figure 16:
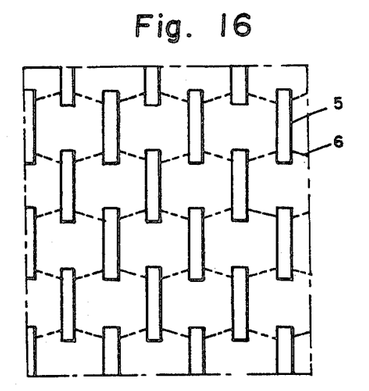
FIGS. 16 to 27 diagrammatically show different arrangements of protectors in the region of the tread of a tire.
Figure 17:
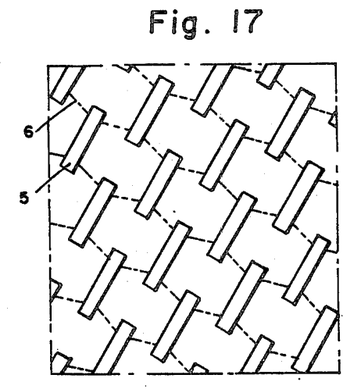
Figure 18:
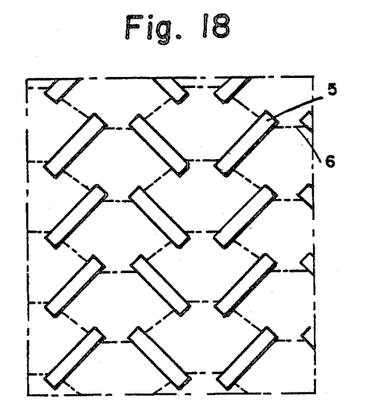
Figure 19:
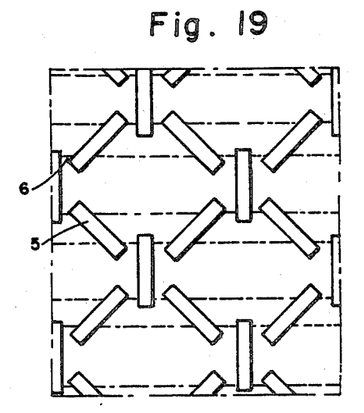
Figure 20:
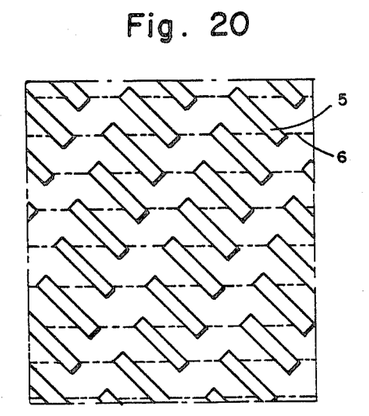
Figure 21:
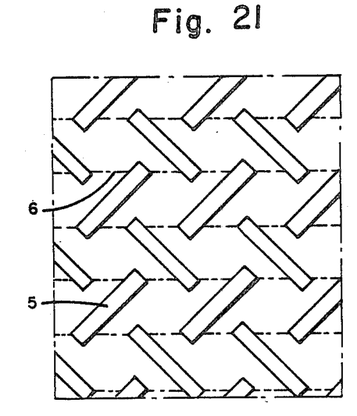
Figure 22:
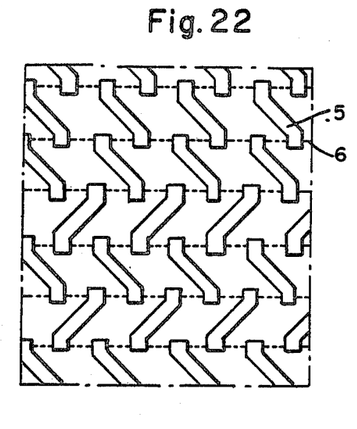
Figure 23:
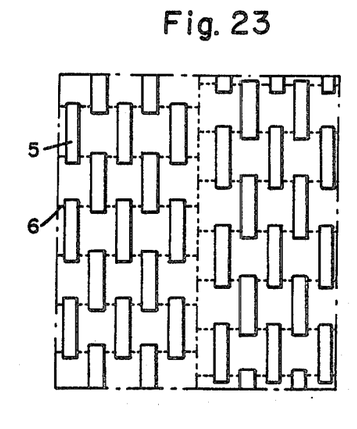
Figure 24:
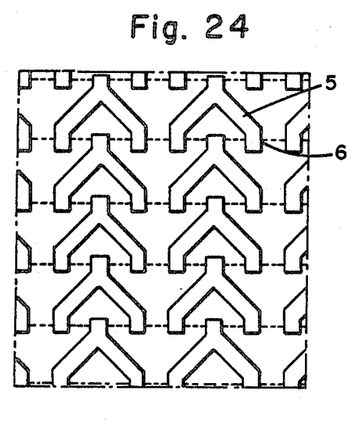
Figure 25:
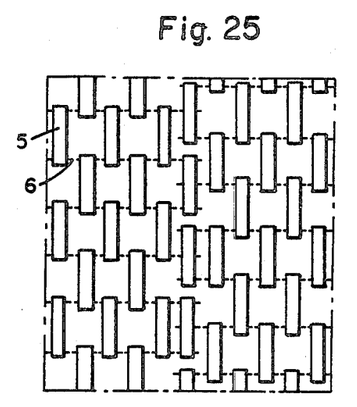
Figure 26:
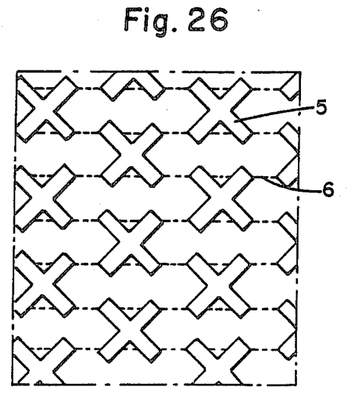
Figure 27:
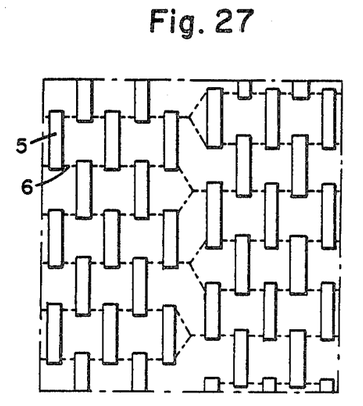

In the phase in which the tire protectors or skid protectors come into contact with the ground, they are unilaterally loaded for short periods. In order to ensure good support even at those instants, solutions of the type shown in FIGS. 12 and 13 or 14 and 15 can be applied. The protector 30 according to FIGS. 12 and 13 is shaped in the form of a crescent and is in full-face contact with the support surface 31 of the recess 3, independently of its angular position. An undesirable point-loading of the rubber is thus excluded. Similar comments apply to the construction according to FIGS. 14 and 15. In this case, the recess 3 is provided with a domed bottom 32, whilst the protector 33 has oblique surfaces 34, one of which in each case can, in the tilted position, bear against a side wall 35 of the recess 3 (compare FIG. 15).

The network configurations reproduced in FIGS. 16 to 27 show possibilities of arranging protectors 5 and retaining strands 6. The figures are self-explanatory so that a more detailed description is superfluous.

Figures 28, 29:
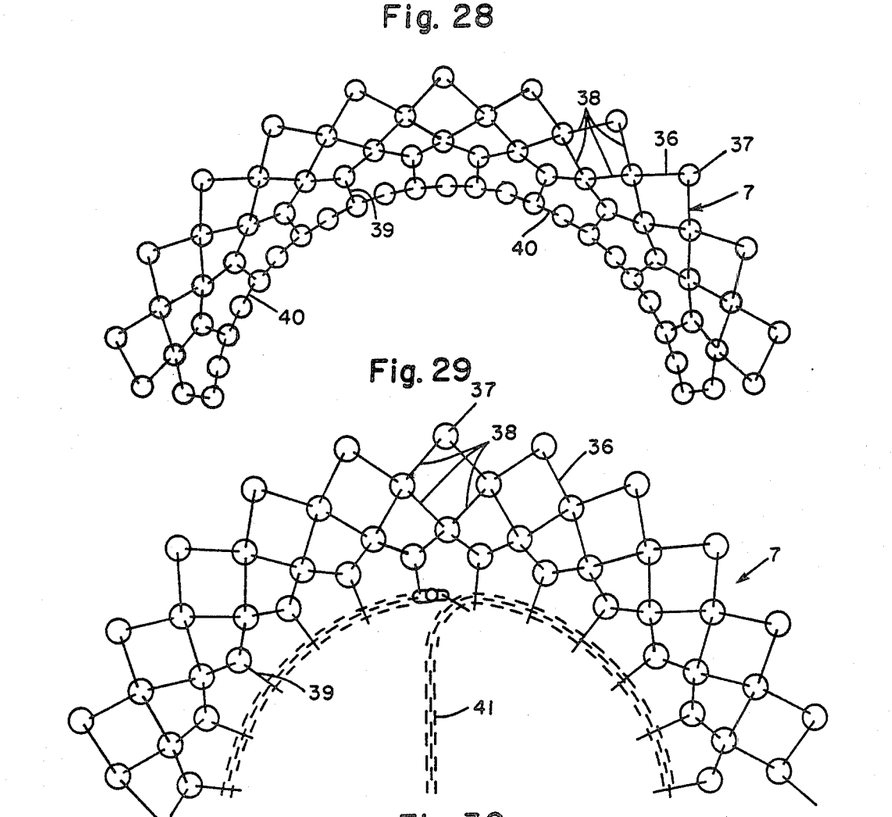
FIG. 28 shows a part view of a part of a lateral chain network arranged on the inside of a vehicle tire.
FIG. 29 shows a part view of a part of a lateral chain network arranged on the outside of a vehicle tire.

FIG. 28 shows a part of a part of a chain network 7 located on the inside of a vehicle tire. It consists of vertical members 36, standing perpendicular to the side wall of the tire, and of horizontal members 37 which lie parallel to the side wall of the tire and form quadrants 38. The lateral chain network 7 as a whole is joined via connecting links 39 to an inner lateral chain 40.

FIG. 29 shows a part of a lateral chain network 7, which is built up in a manner similar to that of the lateral chain network 7, according to FIG. 28, that is to say it also consists of horizontal members 37 and vertical members 36, which form quadrants 38. In this construction the connecting links 39 guide a tensioning chain 41 for tensioning the lateral chain network and the retaining strands 6 joined thereto, which are not shown.

Figure 30:
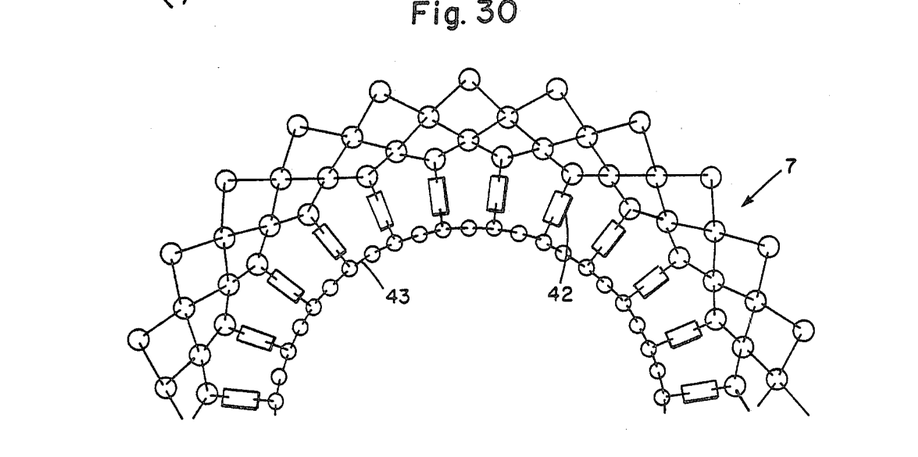
FIG. 30 shows a part view of a part of a lateral chain network fitted with resilient tensioning units.

In FIG. 30 a part of a lateral chain network 7 is shown, which is fitted with a tensioning device which consists of a multiplicity of spring units 42 which are arranged between a lateral chain 43 and the lateral chain network 7.

Figure 31:
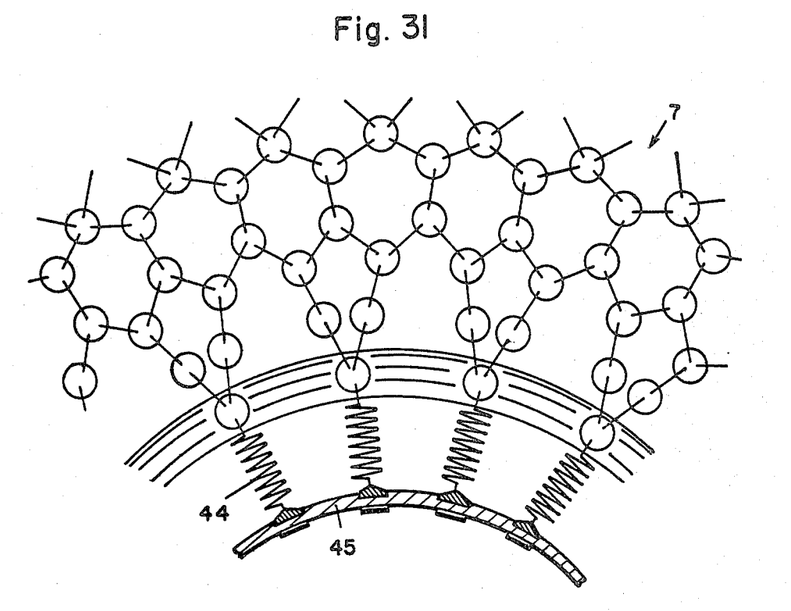
FIG. 31 shows a part view of a part of a modified lateral chain network with resilient tensioning units.

The part of a lateral chain network according to FIG. 31 is of similar construction. In this case, springs 44, one end of which is connected to a tensioning strand 45, serve for holding parts of the lateral chain network.

Figure 32:
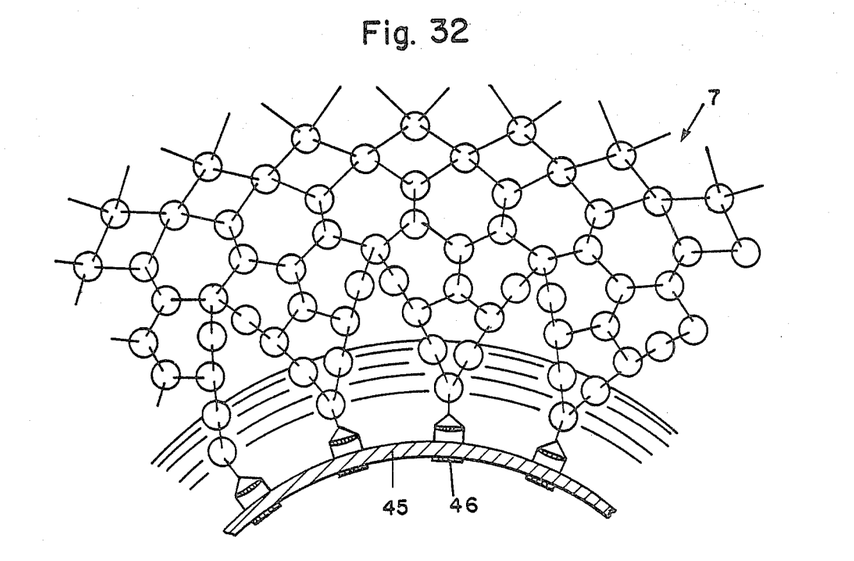
FIG. 32 shows a part view of a part of a lateral chain network, the tensioning device of which comprises a tensioning strand and sliding lugs displaceably guided thereon.

A tensioning strand 45 is also used in the construction according to FIG. 32. In this case the tensioning strand should be capable of being tensioned. Sliding sleeves 46 which are connected to parts of the lateral chain network are displaceably guided on the tensioning strand.

All the lateral chain networks shown in FIGS. 28 to 32 are distinguised by a high degree of flexibility. The use of lateral networks of high flexibility is of particular importance for so-called EM tires (EM=earth moving). EM tires are giant tires which are intended to carry heavy loads in terrain, where there are no tracks, at the highest possible speed over comparatively large distances. In this connection, speeds of the order of magnitude of 50 km/hour are already to be regarded as high speeds, and distances of 500 to 1000 m, such as occur in so-called load-and-carry operations, are already to be regarded as large distances. The vehicles to which EM tires are fitted frequently do not have sprung wheel suspensions and it is therefore a function of the tires to absorb shocks. The latter is accomplished by running the tires at low air pressures. This has the result that they undergo considerable radial resilient inward compression and extensive lateral outward flexing. The flexing work must here not be impeded by the parts of the lateral chain network. The adaptability of the lateral networks is strongly promoted by the fact that the parts of the lateral chain networks, arranged on the opposite sides of the tires, are mutually connected via the retaining strands 6, thus, for example in the case of running at an angle, a kind of compensating movement from one lateral network via the tread network to the other lateral network can take place. Detrimental phenomena, such as occur in conventional tire chains due to the linkage between horizontal members and vertical members, are here excluded. During the compensating movements across the tread, which have been described, the tire protectors or skid protectors do not alter their position or impede the movements of the retaining strands. The yielding capacity of the lateral chain networks is particularly important in the case of radial ply tires.

Furthermore, the tire protection and/or skid protection described is particularly suitable for radial ply tires, because the tread of radial ply tires is comparatively hard and the increased stress, which in itself results from this fact, on components in the region of the tread is largely compensated by the sunk arrangement of the tire protectors or skid protectors. It may also be worth mentioning that, moreover, the tire protectors or skid protectors contribute to the removal of the heat generated by the flexing work in the tread of the tire during fast driving over comparatively long distances.

We claim:

1. In a device for protecting tires and/or preventing skidding of tires, the tread of said tires defining recesses for receiving tire protectors or skid protectors and grooves for accommodating retaining strands, said retaining strands being adapted to hold said protectors in said recesses and said retaining strands being movable relative to said protectors, the improvement comprising:
each of said protectors (5) being held in said respective recess (3) by at least two retaining strands (6) which pass the tire tread surface substantially transversely to the direction of running of the tire and which are connected to lateral chains or parts of lateral chain networks (7) extending along the side walls (8) of the tire, and a tensioning device (9) operatively associated with said lateral chains or chain networks for tensioning said protectors via said lateral chains or chain networks.

2. A device according to claim 1, characterized in that the retaining strands (6) consist of chain links (12).

3. A device according to claim 1, characterized in that the retaining strands (6) are releasably joined to the lateral chains or parts of lateral chain networks (7).

4. A device of claims 2 or 3, characterized in that the chain links (12) of the retaining strands (6) have smaller dimensions than the chain links (13) of the parts of the lateral chain networks (7).

5. A device according to claim 1, characterized in that the recesses (3) for the protectors (5) are deeper than the grooves (4) for the retaining strands (6).

6. A device according to claim 1, characterized in that the protectors (5) are provided, close to each of their ends, with one guide channel (14) for the retaining strands (6).

7. A device according to claim 6, characterized in that the guide channels (14) fully enclose the retaining strands (6) in the region of the protectors (5).

8. A device according to claims 6 or 7, characterized in that each retaining strand (6) passes through front and rear guide channels (14) of protectors (5).

9. A device according to claims 6 or 7, characterized in that the guide channels (14) widen from the middle of the protectors (5), in the manner of truncated double cones.

10. A device according to claim 1, characterized in that the lateral chain networks (7) are designed as a protection for the side wall of the vehicle tire (1).

11. A device according to claim 10, characterized in that the lateral chain networks (7) have the configuration of a net in the form of quadrants.

12. A device according to claims 3 or 11, characterized in that two retaining strands (6) are in each case joined via one chain lock (10) to the lateral chain networks (7).

13. A device according to claim 2, characterized in that the pitch (t) of the chain links (12) of the retaining strands (6) is smaller than the width (B) of the protectors (5).

14. A device according to claims 1 or 5, characterized in that the depth ($T_1$) of the recesses is smaller than the height (H) of the protectors (5).

15. A device according to claim 1, characterized in that the protectors (26) are reversible.

16. A device according to claim 1, characterized in that the protectors (19) are provided with at least one projection (20) which protrudes beyond the tread (2) of the vehicle tire (1).

17. A device according to claim 15, characterized in that the protectors (26) are provided on opposite sides with at least one projection (27) and a depression (28) located in the bottom of the recess (3) is in each case associated with a projection (27).

18. A device according to claims 16 or 17, characterized in that the protectors are partially hardened.

19. A device according to claims 16 or 17, characterized in that the protectors (21) are provided with a wear facing (22).

20. A device according to claims 16 or 17, characterized in that the protectors (17) are fitted with spikes (18).

21. A device according to claim 1, characterized in that the protectors (30) have a semi-circular outer surface which bears against a semi-circular supporting surface (31) of the recess (3).

22. A device according to claim 1, characterized in that the protectors (33) are provided with oblique surfaces (34), by means of which they can be supported in a tilted position on side walls (35) of the recesses (3) provided with a domed bottom (32).

23. A device according to claim 1, characterized in that the tensioning device (9) is formed by a tensioning chain (41).

24. A device according to claims 1 or 2, characterized in that the tensioning device is formed by a tensioning strand (45) and by sliding sleeves (46) which are guided thereon and which are connected to the particular parts of the lateral chain networks (7).

25. A device according to claims 1 or 2, characterized in that the tensioning device is provided with spring units (42) for automatic re-tensioning of the retaining strands (6).

26. A device according to claim 1, characterized in that the retaining strands run at an angle to the tread of the vehicle tire.

27. A device according to claim 1, characterized in that the retaining strands (6) run below the level of the tread (2) of the vehicle tire (1).

28. A device according to claim 1, characterized in that the protectors (5) are seated in the recesses (3) with slight frictional contact.

29. A device according to claim 1 characterized in that the surface of the protectors is profiled.

* * * * *